Jan. 5, 1954     A. G. BEASLEY     2,664,620
EXPANSION TOOL
Filed July 28, 1951
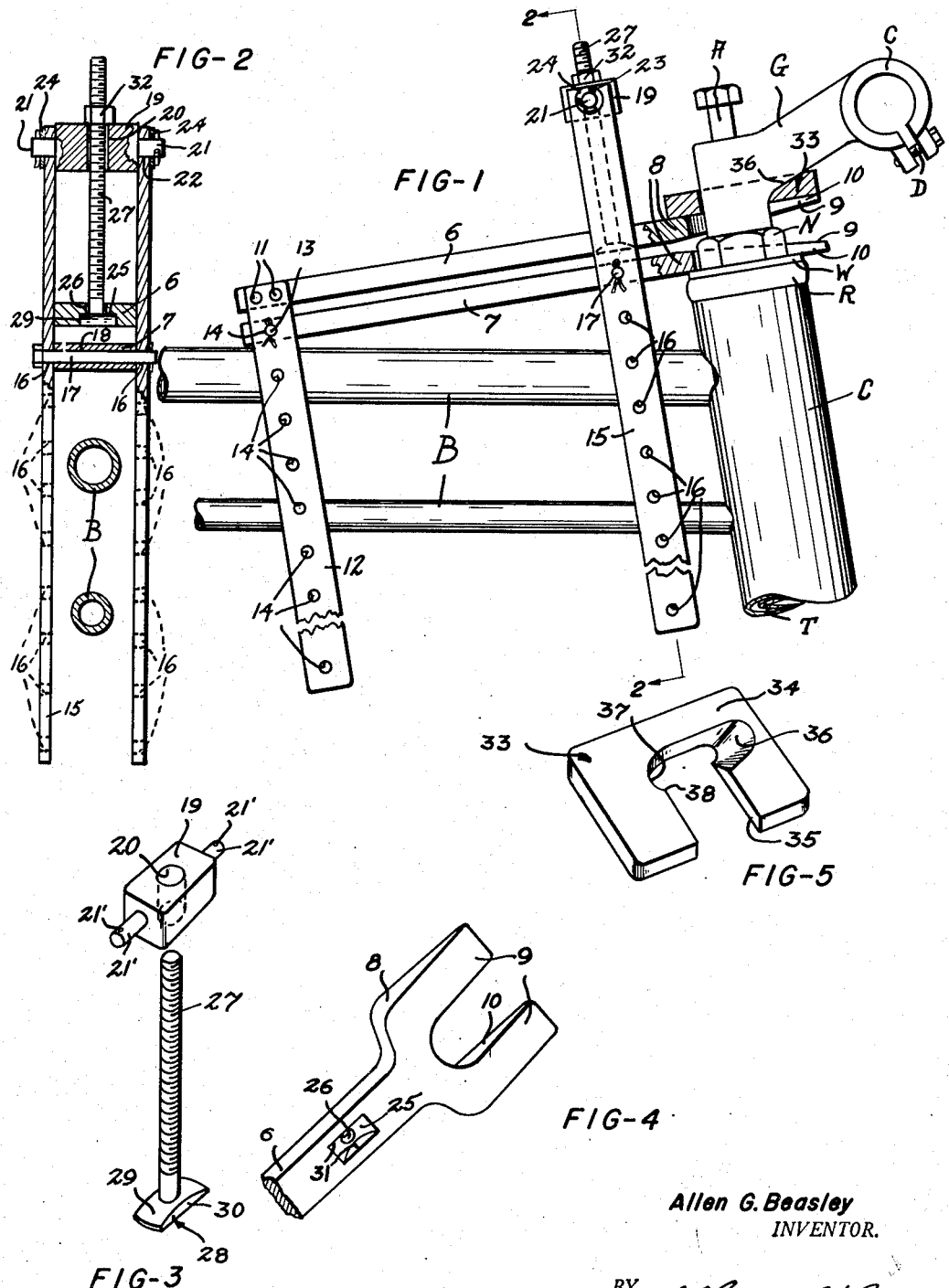
Allen G. Beasley
INVENTOR.
BY Glenn L. Fish
ATTY.

Patented Jan. 5, 1954

2,664,620

UNITED STATES PATENT OFFICE 2,664,620

EXPANSION TOOL

Allen G. Beasley, Spokane, Wash., assignor to Charley W. Beasley, Spokane, Wash.

Application July 28, 1951, Serial No. 239,139

2 Claims. (Cl. 29—256)

This invention relates to new and useful improvements in tools of the expansion pressure class.

One object of the invention lies in the provision of an expansion tool which is of simple construction and comprises a few parts assembled in such a manner as to permit a wide variation of adjustment for use.

Another object of the invention lies in the provision of a pair of hingedly connected levers adapted to be spread at their free ends opposed to the hinges and exert great spreading or expansion pressure.

Another object of the invention lies in the provision of heads on the levers adapted for application to a bicycle for the purpose of removing the goose neck which mounts the handle bars upon the front steering fork.

Another object of the invention lies in the provision of a cross head trunnioned in a pair of side bars and having a central vertical opening through which passes a threaded rod pivotally secured to the upper lever of a pair of levers, there being a nut on the rod, above the cross head, which when rotated clockwise serves to draw the upper lever upwardly away from the lower lever adjustably secured in the side bars.

Another object of the invention lies in the provision of an adaptor die which enables the tool to properly withdraw a bicycle goose neck from the upper tubular portion of the front steering fork.

Another object of the invention lies in the provision of an expansion tool which comprises a minimum number of parts and which may be manufactured at a reasonably low price and is very simple to use.

Other objects and advantages will be apparent during the course of the following description.

In the accompanying drawings, forming a part of this specification, and in which like numerals are employed to designate like parts, Figure 1 is a side elevation of my improved expansion tool, with portions broken away for clarity of illustration, and mounted in position for removing a goose neck from a bicycle, Figure 2 is a transverse cross section as at line 2—2 of Figure 1, Figure 3 is an exploded perspective view of the threaded rod and cross head, Figure 4 is a fragmentary perspective view of the under side of the upper lever, and Figure 5 is a perspective view of the adaptor die for use therewith.

The drawing and specification of this application for a patent exemplify the expansion tool as a tool for removing the goose neck from a bicycle, but I desire it understood that the tool may be used for other purposes where the principles of my invention as particularly set forth in the claims shall be found adaptable; for instance as a valve lifter for automobile engines, or to remove the seat post from a bicycle and other uses.

In Figure 1 I have shown a portion of a bicycle in side elevation which includes the tubular front fork bearing chamber C with horizontal braces B secured thereto and spaced one above the other. The upper bearing ring R contains the upper bearing and a retainer washer W is held in place by a nut N which threads onto the upper end of the pivotal tube T carried by the front fork.

The goose neck G has a bolt A which secures it in the pivotal tube T and has a jaw clamp J provided with a tightening bolt D for securing the handle bars therein.

To remove the front fork from a bicycle, it is necessary to remove the goose neck G but it is often found to be rusted into the fork tube T and ordinary pulling will not remove it when in this condition. Heretofore a hammer has been used to attempt to drive the goose neck upwardly and out and even though one is some times successful in removing the goose neck this way, it is usually so mutilated that a new one must be applied when assembling the bicycle.

In my invention, I have found a tool which very effectively removes the goose neck of a bicycle without mutilating either the goose neck or the bicycle and which comprises a pair of spaced upper and lower levers 6 and 7 which have heads 8 at their forward ends formed of two parallel spaced tongues 9 tapered toward their outer ends and defining a recess 10 therebetween. The recess 10 is of such width as to permit its passing about nut N as an open end wrench, and bear or rest upon the washer W.

Upper lever 6 is secured at its rear end to transversely spaced hinge bars 12 by rivets 11, and lower lever 7 is pivotally secured to said hinge bars 12 by means of a headed rod 13 which passes through an opening formed transversely through lever 7 adjacent its rear end and the rod 13 has a transverse cotter key receiving hole adjacent its end for securing the rod in place. Hinge bars 12 are provided with holes 14 spaced longitudinally along the bars for the full length of each and the holes 14 are transversely aligned with the holes in the other bar 12. The lower lever is thus pivotally mounted for selective adjustment along the length of said hinge bars.

Spaced forwardly from said hinge bars, I have provided a pair of transversely spaced parallel side bars 15 which are somewhat longer than said hinge bars 12 and thus positioned to extend upwardly above upper lever 6 a short distance and below lower lever 7 equally as far as hinge bars 12. The portion of each side bar 15 below upper lever 7 is provided with longitudinally spaced holes 16 corresponding in spacing to the holes 14 of hinge bars 12 and lever 7 is removably secured to the side bars by a headed rod 17 which passes through aligned holes 16 and a transverse hole 18 formed in the body of the lever. The usual cotter key secures the rod against displacement.

To mount lever 6 to provide for spreading of the heads 8 of the levers, I have provided a cross head 19 which has a vertical opening 20 therethrough, and horizontally extending trunnions 21 on each side thereof. Adjacent their upper ends, side bars 15 are provided with bores 22 through which trunnions 21 pivotally pass. Transverse holes 21' are drilled through the trunnions 21 adjacent their ends to receive cotter keys 23 after washers 24 have been applied.

An arcuate socket 25 is formed in the bottom face of lever 6 in transverse alignment with side bars 15, and a vertically disposed bore 26 is provided in the lever and communicates with said socket centrally thereof. A vertically disposed rod 27 loosely passes through the bore 26 and has a head 28 with a convex face 29 for face to face engagement with said socket 25 and the loose fit between the rod and bore 26 permits limited pivotal movement longitudinally of the lever. The flat side faces 30 on head 28 cooperate with the inner edge faces 31 of socket 25 to prevent axial rotation of rod 27.

Rod 27 extends upwardly through loosely fitting opening 20 in cross head 19 and a nut 32 is applied thereon. Clockwise rotation of nut 32 serves to draw rod 27 upwardly thus raising upper lever 6 and spreading or expanding heads 8 under pressure.

To adapt the head 8 of upper lever 6 for removing the goose neck of a bicycle, I have provided a die 33 formed with a substantially U-shaped body 34 and having a central recess 35 formed at its heel with an angular saddle portion 36 for abutting the angular under face of goose neck G, and an opposed arcuate hollow 37 which forms a defining shoulder 38 in the recess. The die is placed on the upper head 8 in crossed relation thereto and by means of the expansion tool raised to contact the goose neck and retain it against slipping from the saddle and recess.

Having thus described my invention, I claim:

1. An expansion tool comprising upper and lower levers having bifurcated heads on their forward ends; vertical side bars extending above and below said levers one on each side thereof and disposed spaced rearwardly from the heads intermediate the lengths of the levers; a cross head trunnioned between upper ends of said side bars; said cross head having an opening extending laterally therethrough; said upper lever having an arcuate socket in its lower face and a vertical bore extending through said lever and communicating with said socket; a threaded rod having a head rockably seated in said socket and its shank extending loosely through said bore and the opening of said cross head; a nut threadedly engaged on said rod above said cross head, whereby rotation of the nut raises and lowers the upper lever; said side bars having a series of vertically spaced axially aligned horizontal apertures; said lower lever having a laterally disposed aperture adapted to be axially aligned with a selected horizontal pair of said first named apertures; a pin removably extending through the aligned first and second named apertures to secure said lower lever in selective spaced relation to said upper lever; hinge bars secured at their upper ends to the rear end portion of said upper lever and depending therefrom; said hinge bars having a series of vertically spaced axially aligned horizontal apertures; said lower lever having a laterally extending aperture at its rear end and disposed to be axially aligned with said hinge bar apertures; and a rod extending through the last named aligned apertures to pivotally secure the lower lever to said hinge bars.

2. The invention as defined in claim 1, wherein the inner faces of the upper and lower levers are tapered at the head portions toward their forward free edges whereby said faces may be placed in face to face engagement with the lever bodies diverging toward their rear ends with relation to each other.

ALLEN G. BEASLEY.

References Cited in the file of this patent

UNITED STATES PATENTS

| Number | Name | Date |
|---|---|---|
| 1,051,633 | Price | Jan. 28, 1913 |
| 1,451,715 | Seppmann | Apr. 17, 1923 |
| 1,897,737 | Snarr | Feb. 14, 1933 |